United States Patent [19]

Yoshinaga

[11] Patent Number: 5,276,088
[45] Date of Patent: Jan. 4, 1994

[54] METHOD OF SYNTHESIZING CYCLODEXTRIN POLYMERS

[75] Inventor: Masanobu Yoshinaga, Tokyo, Japan
[73] Assignee: Toppan Printing Co., Ltd., Tokyo, Japan
[21] Appl. No.: 776,295
[22] PCT Filed: May 20, 1991
[86] PCT No.: PCT/JP91/00667
§ 371 Date: Dec. 6, 1991
§ 102(e) Date: Dec. 6, 1991
[87] PCT Pub. No.: WO91/18023
PCT Pub. Date: Nov. 28, 1991

[30] Foreign Application Priority Data

May 21, 1990 [JP] Japan .................. 2-130515

[51] Int. Cl.$^5$ .................. C08G 63/48; C08G 63/91
[52] U.S. Cl. .................. 525/54.3; 525/54.31
[58] Field of Search .................. 536/1.1, 103; 525/54.3, 525/54.31

[56] References Cited

U.S. PATENT DOCUMENTS 4,274,985 6/1981 Szejtli et al. .................. 524/47
4,357,468 11/1982 Szejtli et al. .................. 536/56

OTHER PUBLICATIONS

Abstract of JP-A 63-314201, Dec. 22, 1988; Masaharu Horie, "Method for Immobilizing Cyclodextrin".
Abstract of JP-A 61-129566, Jun. 17, 1986; Toshiyuki Shono, "Methylated Cyclodextrin Stationary Phase and Liquid Chromatography Used Therein".
Abstract of JP-A 60-248729, Dec. 9, 1985; Kazuaki Harada, "Polycyclodextrin Resin Having Aminoalkylamino Group and its Production".
Abstract of JP-A 59-227906, Dec. 21, 1984; Iwao Tabuse, "Immobilized Cyclodextrin Amino Derivative and its Production".
Abstract of JP-A 55-75402, Jun. 6, 1980; Kouji Itagaki, "Fixing of Cyclodextrin".

Primary Examiner—Nathan M. Nutter
Attorney, Agent, or Firm—Armstrong, Westerman, Hattori, McLeland, & Naughton

[57] ABSTRACT

Method of synthesizing cyclodextrin polymers either by reacting polyvinyl alcohol or cellulose or derivatives thereof with cyclodextrin derivatives or by copolymerizing cyclodextrin derivatives with vinyl acetate or methyl methacrylate, and process for producing cyclodextrin membranes by forming membranes using those cyclodextrin polymers.

The cyclodextrin polymers obtained by the present invention are capable of containing cyclodextrin as introduced at high levels and, in addition, cyclodextrin membranes obtained by using the cyclodextrin polymers of the present invention benefit from the fact that the polymers themselves have a film forming property and, hence, the membranes can be used on their own without needing other supporting membranes.

9 Claims, No Drawings

METHOD OF SYNTHESIZING CYCLODEXTRIN POLYMERS

TECHNICAL FIELD

This invention relates to a method of synthesizing cyclodextrin containing polymers, as well as a process for producing cyclodextrin containing solid membranes.

BACKGROUND ART

Cyclodextrin combines with various guest compounds in aqueous solutions to form structurally specific inclusion compounds. Thus, cyclodextrin containing solid membranes are expected to have unique performance, particularly in terms of separating and permeating capabilities and cyclodextrin, if it is supported on high polymers, is anticipated to exhibit various physical properties that have been impossible to obtain when it is used alone; since this brings about the advantage of expanded applications, it has been desired to develop a method by which cyclodextrin-containing membranes can be freely prepared.

As regards the preparation of such cyclodextrin membranes, Unexamined Published Japanese Patent Application No. 232210/1985 discloses a method in which the crystal of a cyclodextrin inclusion compound and a high polymer comprised of a compound having an isocyanate group are cast onto a commercial ultrafiltration membrane, and Unexamined Published Japanese Patent Application No. 258702/1987 discloses a method in which cyclodextrin reacted with a variety of monomers is copolymerized with acrylonitrile derivatives to obtain high polymers, which are then processed into membranes by known methods.

However, the method disclosed in Unexamined Published Japanese Patent Application No. 232210/1985, supra has the disadvantage that the cyclodextrin membrane cannot be used as the membrane of high polymer per se, whereas the method disclosed in Unexamined Published Japanese Patent Application No. 258702/1987 has had the problem that the degree of introduction of cyclodextrin in the obtained membrane of high polymer is so low as 3–4% that satisfactory characteristics cannot be achieved.

Therefore, the object of the present invention is to provide a method of synthesizing cyclodextrin polymers that enables cyclodextrin to be contained as introduced to high levels.

It is also the object of the present invention to provide a process for producing cyclodextrin membranes that contain cyclodextrin as introduced to high levels and that can be used on their own.

DISCLOSURE OF INVENTION

The present inventors conducted intensive studies under these circumstances and found, as a result, that the above-stated object of the present invention could be solved by a method of synthesizing cyclodextrin polymers characterized by reacting polyvinyl alcohol or derivatives thereof with cyclodextrin derivatives, and also by a process for producing cyclodextrin membranes by forming membranes using said cyclodextrin polymers.

In particularly preferred embodiments of the present invention, said polyvinyl alcohol derivatives are obtained by reacting polyvinyl alcohol with carbonyl compounds, or by acetalizing polyvinyl alcohol through reaction with aldehydes, or by reacting polyvinyl alcohol with ketones. It is also preferred that said cyclodextrin derivatives are aldehyde derivatives of cyclodextrin.

In another preferred embodiment of the present invention, cyclodextrin polymers are synthesized in such a way that said reaction between polyvinyl alcohol or derivatives thereof and cyclodextrin derivatives is carried out by grafting cyclodextrin derivatives onto polyvinyl alcohol or derivatives thereof for polymerization.

At the same time, the object of the present invention is attained by a method of synthesizing cyclodextrin polymers characterized by either copolymerizing cyclodextrin derivatives with methyl methacrylate or saponifying the polymers obtained by copolymerizing cyclodextrin derivatives with vinyl acetate, as well as by a process for producing cyclodextrin membranes by forming membranes using said cyclodextrin polymers. Further, the object of interest is attained by a method of synthesizing cyclodextrin polymers characterized by reacting cellulose derivatives with cyclodextrin or its derivatives, as well as by a process for producing cyclodextrin membranes by forming membranes using said cyclodextrin polymers.

On the pages that follow, the present invention is described in greater detail.

In the present invention, polyvinyl alcohol (PVA) which is excellent not only in film-forming characteristics but also in film strength and continuous handling property is reacted with carbonyl compounds such as aldehydes and ketones to synthesize PVA derivatives having high reactivity with cyclodextrin derivatives and those PVA derivatives are reacted with cyclodextrin derivatives to incorporate cyclodextrin units at high levels of introduction to obtain PVA-cyclodextrin polymers (those polymers, as well as other polymers that contain cyclodextrin are hereunder referred to as "cyclodextrin polymers"). If desired, by using aldehyde derivatives of cyclodextrin as said carbonyl compounds, cyclodextrin polymers can be directly obtained without passing through the stage of synthesis of PVA derivatives.

The carbonyl compounds to be used in the present invention preferably include aldehydes and ketones and exemplary aldehydes are listed below:

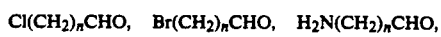

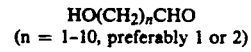
(n = 1–10, preferably 1 or 2)

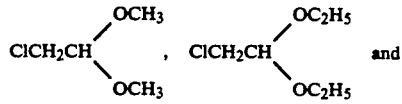

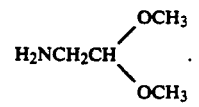

Among the compounds listed above, $Cl(CH_2)_nCHO$ (n=1 or 2) is preferred and specific compounds include 3-chloro(or bromo)propionaldehyde, 3-hydroxypropionaldehyde, 3-amino-propionaldehyde, 2-chloro(or bromo)acetaldehyde, 2-hydroxyacetaldehyde, 2-aminoacetaldehyde and aldehyde derivatives of cyclodextrin.

In particular, the aldehyde derivatives of cyclodextrin may be exemplified by β-cyclodextrin compounds of the aldehydes listed above and specific examples include the following:

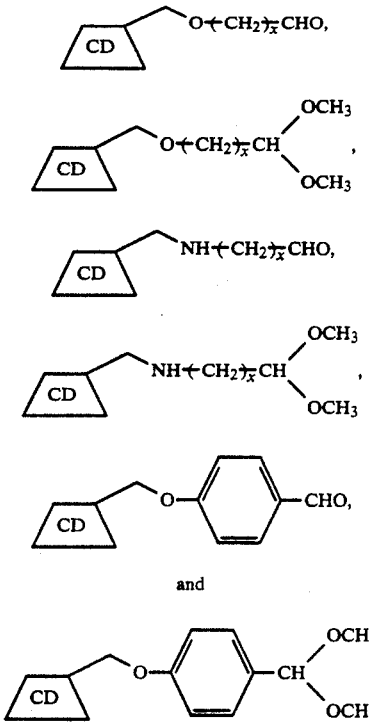

and (where X=1-10, preferably 1 or 2).

Exemplary ketones include the following:

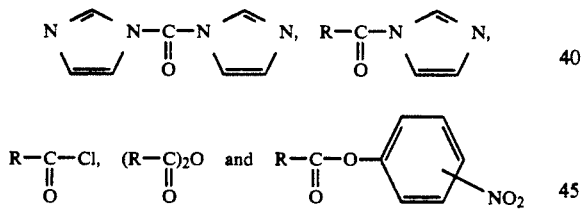

(R is not limited in any particular way but preferred examples are an alkyl group, an aryl group, a heterocyclic group and a halogen atom).

Among these compounds, the following are preferred:

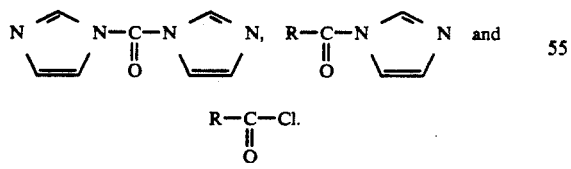

PVA that can be used in the present invention preferably has a molecular weight of at least 10,000 from the viewpoint of film-forming property; if desired, those which are combined with other PVA molecules or cyclodextrin derivatives by partial crosslinking of the individual hydroxyl groups may also be used.

In the present invention, the above-described PVA-cyclodextrin composed cyclodextrin polymers can be obtained by the following exemplary reaction schemes:

(A)

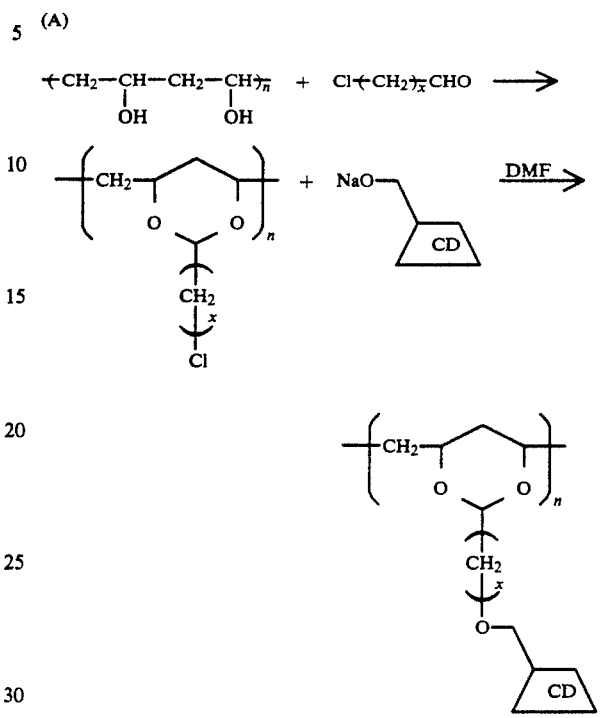

(B)

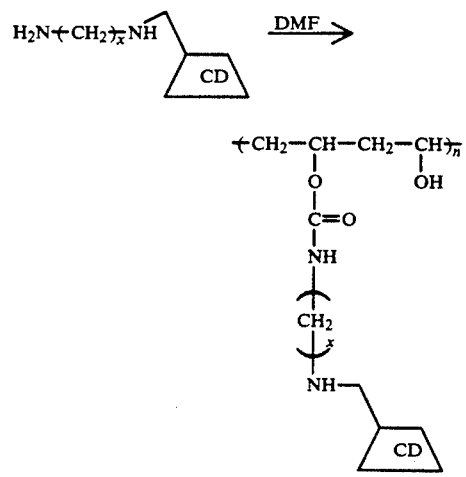

(C)

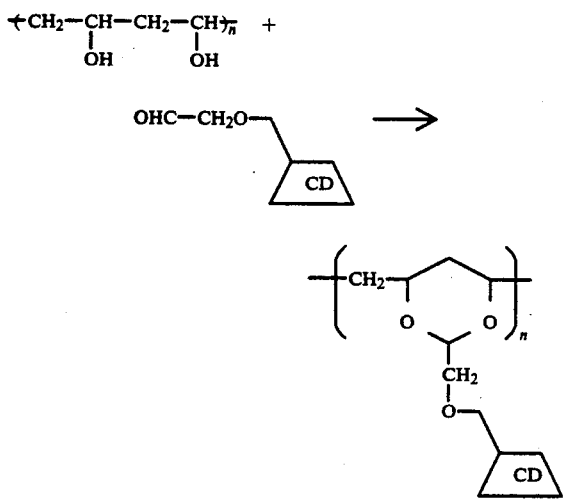

where CD represents cyclodextrin.

As described above, the preferred embodiments of the present invention include: a method of obtaining cyclodextrin polymers by first reacting PVA with aldehydes to form acetalized precursors, which are then reacted with cyclodextrin derivatives; a method of directly obtaining cyclodextrin polymers by using aldehyde derivatives of cyclodextrin as said aldehydes; and a method of obtaining cyclodextrin polymers by reacting PVA with ketones such as N,N'-carbonyldiimidazole.

The reaction conditions for the synthesis of the cyclodextrin polymers of the present invention which is typified by the above-shown schemes (A)-(C) can be selected as appropriate in accordance with such factors as the compounds used or the object of their use. Speaking, for example, of the method in which PVA is reacted with carbonyl compounds to generate PVA derivatives as precursors, which are then reacted with cyclodextrin derivatives to obtain cyclodextrin polymers, the reaction for obtaining the PVA derivatives as precursors may be carried out under such conditions that PVA and the aforementioned carbonyl compounds are used in proportions of 1:1 to 1:100, in an air or nitrogen atmosphere, at a temperature of 20°-100° C., preferably 60°-80° C., for a time period of 1-24 h, preferably 6-24 h.

Further, the reaction to be performed between said PVA derivatives and cyclodextrin derivatives to obtain cyclodextrin polymers may be carried out under such conditions that the PVA derivatives and cyclodextrin derivatives are used in proportions of 1:10 to 1:100, in air, preferably in a nitrogen atmosphere, at a temperature of 20°-100° C., preferably 60°-80° C., for a time period of 1-48 h, preferably 6-30 h.

On the other hand, in the method of synthesizing cyclodextrin without forming the precursor as an intermediate, the reaction between PVA and aldehyde derivatives of cyclodextrin may be carried out in the same manner as in the case of using the aforementioned precursor.

Polyvinyl alcohol (PVA) and polymethyl methacrylate (PMMA) are generally excellent in film-forming characteristics and have high film strength and continuous handling property. However, particularly in the case of PVA, its structural unit does not exist as a monomer. Therefore, after copolymerizing cyclodextrin derivatives with vinyl acetate, saponification may be performed using an alkali solution so that the vinyl acetate units are decomposed into vinyl alcohol units, whereby copolymers can be obtained that have as good film-forming property as in the case where polyvinyl alcohol is used. On the other hand, PMMA-cyclodextrin polymers can be obtained by copolymerizing methyl methacrylate with cyclodextrin derivatives but desired films can be made without performing saponification after the polymerization.

Preferred examples of cyclodextrin derivatives that can be used in synthesizing the cyclodextrin polymers described above are listed below:

i) allyl ether type

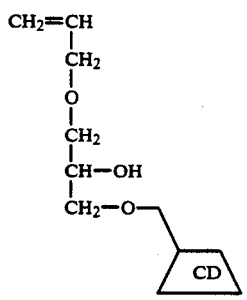
(a)

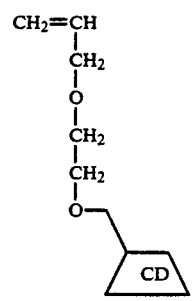
(b)

ii) methacrylic acid type

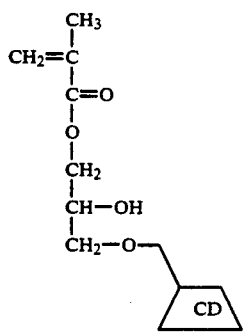
(c)

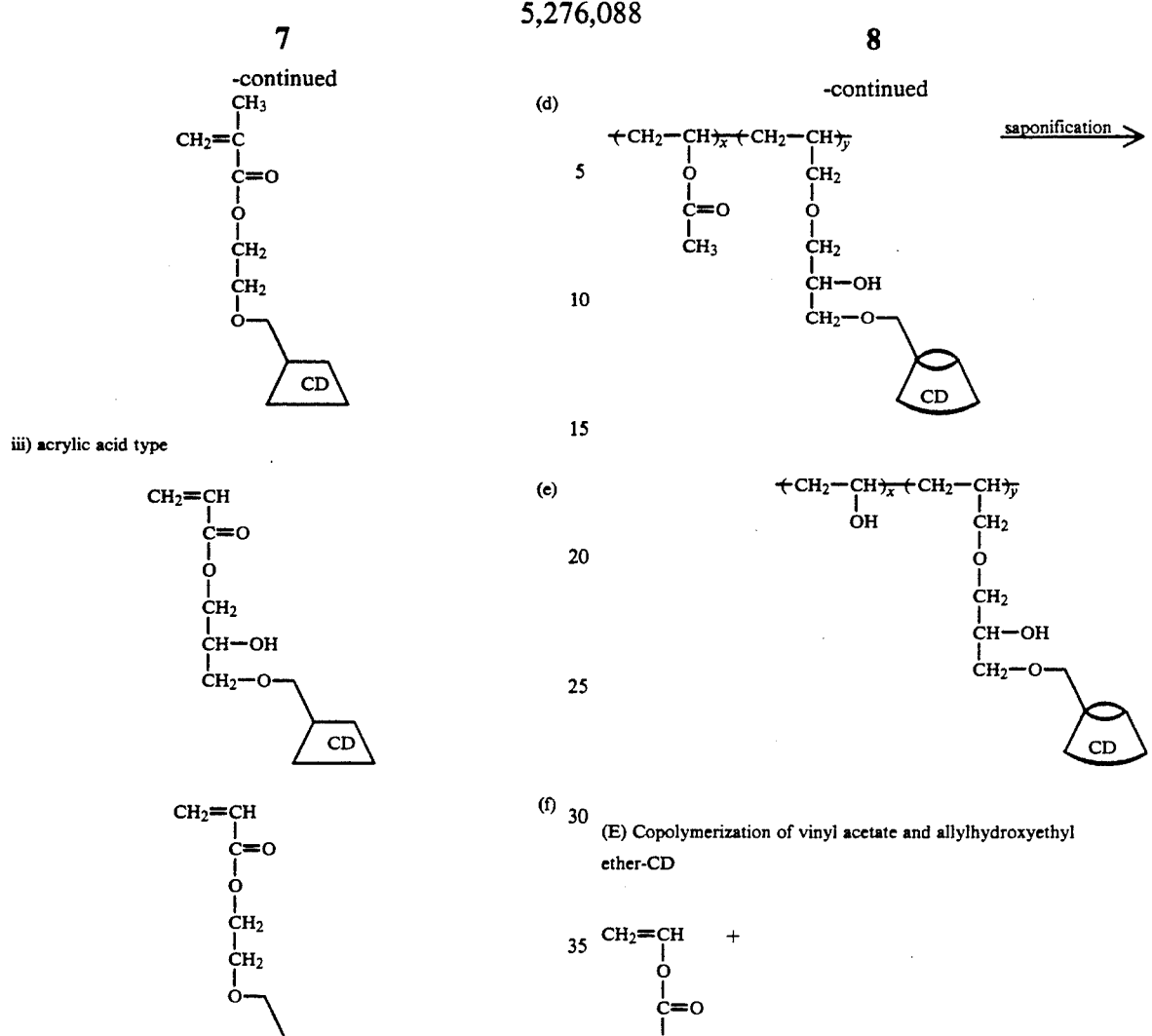
iii) acrylic acid type
The reaction for copolymerizing cyclodextrin derivatives with vinyl acetate to obtain the copolymers of the present invention may be carried out by the following exemplary schemes:
(D) Copolymerization of vinyl acetate and allylglycidyl ether-CD
(E) Copolymerization of vinyl acetate and allylhydroxyethyl ether-CD
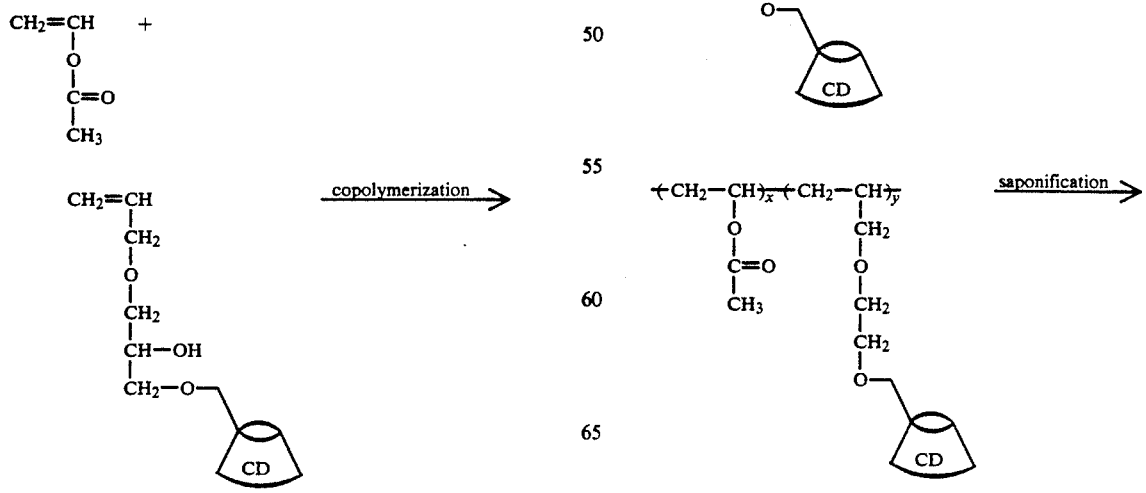

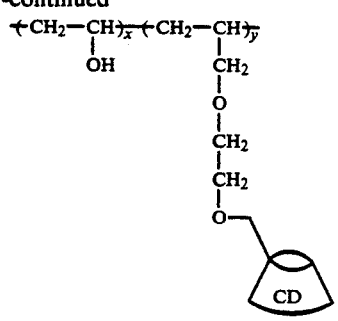

(where CD represents cyclodextrin.)

The copolymerization of cyclodextrin derivatives with methyl methacrylate is also carried out by the same route except that no saponification is performed.

In the present invention, the above-described reactions of copolymerization can be carried out under various conditions in accordance with the specific object of interest, for example, in solvents such as dimethylformamide (DMF) and dimethyl sulfoxide (DMSO), with polymerization initiators such as $\alpha,\alpha'$-azobisisobutyronitrile (AIBN) and benzoyl peroxide being used in amounts of 0.1–1.0 wt % of the total amount of monomers. During copolymerization, the total monomer concentration is beneficially in the range of 30–50 wt %. Further, the feed ratio of vinyl acetate or methyl methacrylate to cyclodextrin derivative is in the range of 7:3 to 9:1, and if the reaction temperature is 20 (room temperature) to 60° C., the reaction may be carried out for a time period of 12–48 h for the case where vinyl acetate is used, and for a time period of 6–48 h for the case of using methyl methacrylate. The proportions of vinyl acetate monomer or methyl methacrylate to cyclodextrin derivative (x:y) in the copolymer to be obtained are preferably at least 7:3 by weight ratio.

Further, the copolymer to be obtained preferably has a molecular weight of at least 50,000 from the viewpoint of film-forming property.

The saponification described above is performed in order to provide improved film-forming property and may be effected by any known method such as subjecting the obtained copolymer to reaction for 5–6 h under reflux in a liquid mixture of methyl alcohol and an aqueous solution of 2.5N sodium hydroxide. The degree of saponification thus effected is preferably in the range of 50–100%.

Celluloses, whether they are of their own or acetylated, are generally excellent in film-forming characteristics and are extensively used as film bases for various materials. Structurally, celluloses are linear high polymers in which gluclose is condensed to $\beta$-1.4-glucoside and, hence, they are very similar to cyclodextrin.

The present inventors also noted the above-described characteristics of celluloses and successfully obtained cyclodextrin membranes capable of withstanding continuous operations by reacting celluloses with cyclodextrin derivatives so as to bind them chemically.

Stated more specifically, by chemically binding cyclodextrin to celluloses or their derivatives which themselves are excellent in film-forming characteristics and which also have excellent film strength and continuous handling property, cyclodextrin units are introduced to realize the production of cellulose-cyclodextrin polymers having excellent film-forming characteristics.

Preferred examples of cyclodextrin derivatives that are to be reacted with said celluloses or derivatives thereof include cyclodextrin compounds having an amino group, a hydroxyl group, an —ONa group, etc. and specific examples are the following compounds:

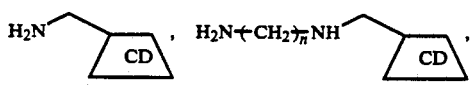

(n is an interger of 2-10)

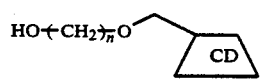

(n is an interger of 2-10)

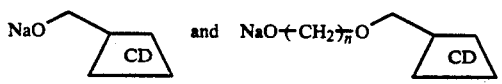

(n is an interger of 2-10)

Cellulose derivatives that can be used in the present invention preferably include: cellulose tosylate and cellulose halides; carboxycellulose; acid chlorides of carboxymethyl cellulose, etc. Celluloses forming such derivatives are preferably selected from among those which have molecular weights of at least ca. 50,000. Also usable are those which are combined with other cellulose molecules or cyclodextrin derivatives, etc. by partial crosslinking of the individual hydroxyl groups.

Examples of the reaction between cyclodextrin or its derivatives and cellulose derivatives include the reaction between cyclodextrin derivatives having an amino group or an —ONa group and cellulose tosylate, and the reaction between acid chlorides of carboxycellulose or carboxymethyl cellulose and cyclodextrin or cyclodextrin derivatives having an amino group or a hydroxyl group.

In the present invention, the above-described cyclodextrin or its derivatives may be reacted with cellulose derivatives to obtain cyclodextrin polymers by the following schemes:

(F)

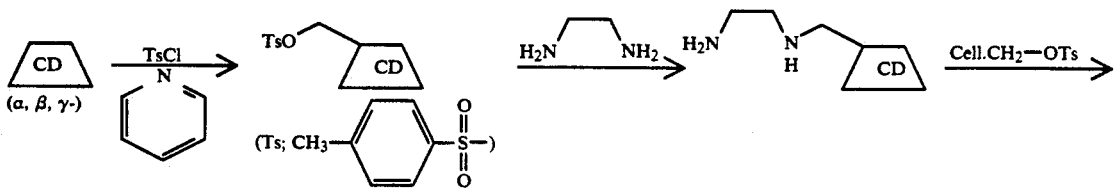

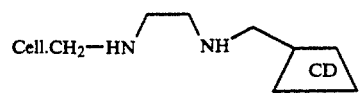
(Cell: cellulose)
(G)
① 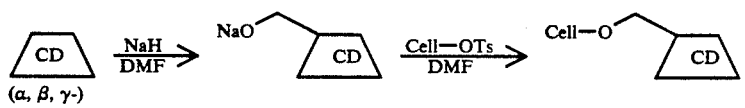
② 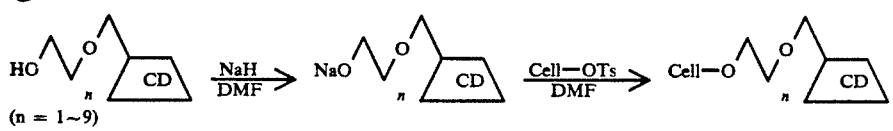
(n = 1~9)
(H)
① 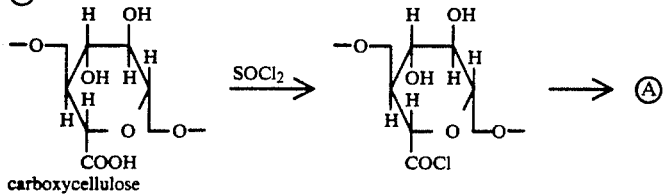
carboxycellulose
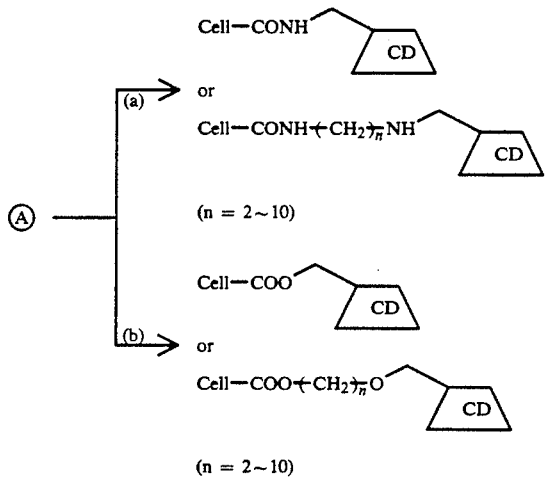
$$\left( Cell = \text{[glucose unit]} \right)$$
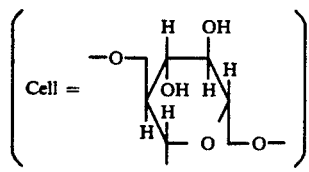
② 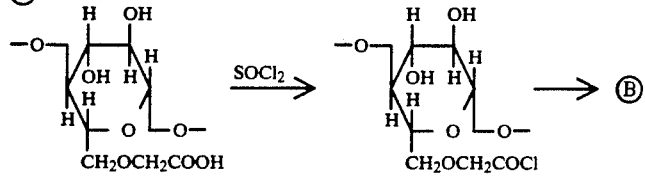
carboxymethyl cellulose

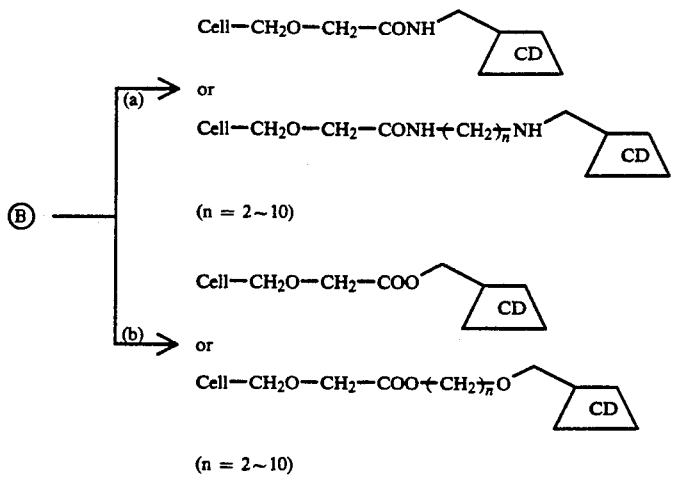

(n = 2~10)

provided

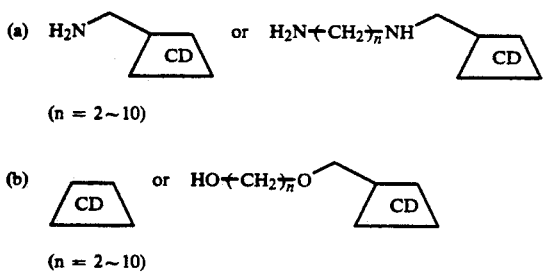

(n = 2~10)

(n = 2~10)

Other reactions can be performed in accordance with the synthesis schemes outlined above.

The present invention further covers an embodiment of the method for obtaining cyclodextrin polymers by reacting polyvinyl alcohol with cyclodextrin derivatives, in which graft polymerization is performed as said reaction.

In this embodiment, cyclodextrin derivatives are grafted onto hydroxyl groups in PVA which is excellent not only in film-forming characteristics but also in film strength and continuous handling property and by the resulting chemical binding, cyclodextri units are introduced to realize the production of PVA-cyclodextrin polymers having excellent film-forming characteristics.

Preferred examples of the cyclodextrin derivatives that are used in the embodiment described above include acrylic acid amides or methacrylic acid amides having a cyclodextrin residue, or acrylic acid esters or methacrylic acid esters having a cyclodextrin residue, and particularly preferred examples are the following:

i) acrylic acid type

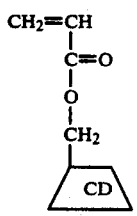
(1)

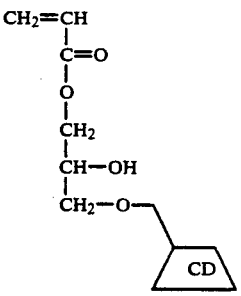
(2)

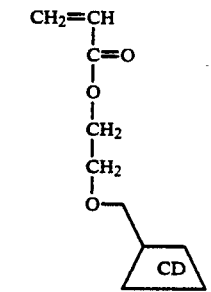
(3)

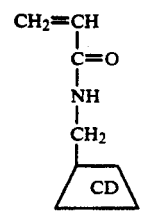
(4)

-continued ii) methacrylic acid type

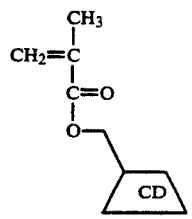
(5)

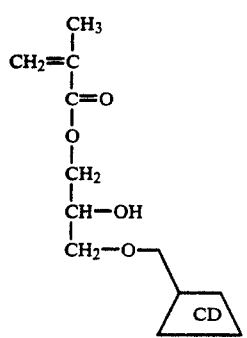
(6)

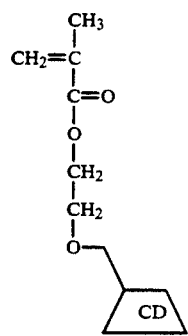
(7)

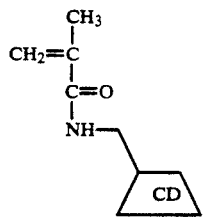
(8)

As already described above, PVA that can be used in the present invention preferably has a molecular weight of at least 10,000 but, if desired, those which are combined with other PVA molecules or cyclodextrin derivatives, etc. by partial crosslinking of the individual hydroxyl groups may also be used.

The reaction for grafting cyclodextrin derivatives of the acrylic acid type onto PVA may be performed as follows by adopting, for example, radical graft polymerization using ammonium cerium nitrate as a catalyst:

(I) Reaction between PVA and acrylic acid amide having cyclodextrin residue

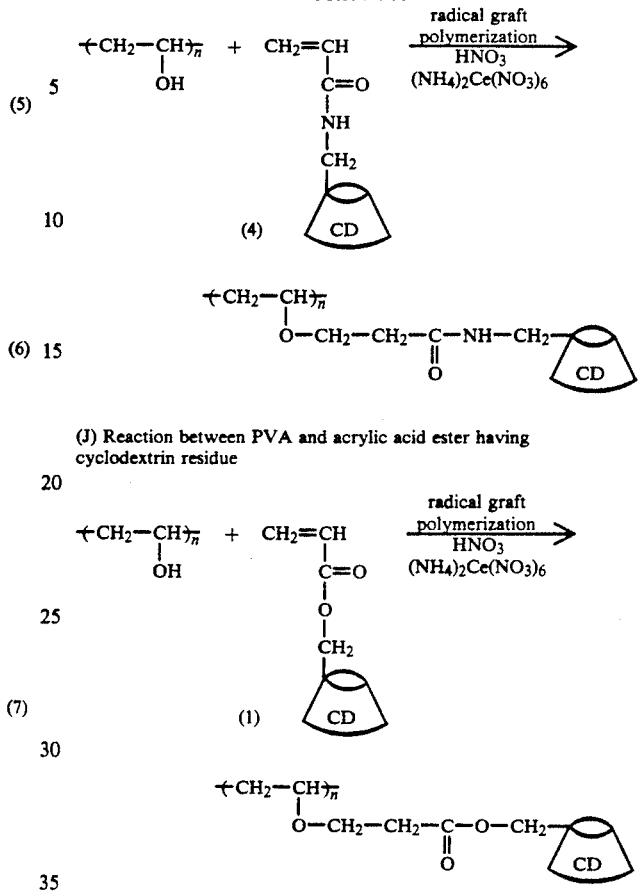

(J) Reaction between PVA and acrylic acid ester having cyclodextrin residue (where CD represents cyclodextrin.)

The above-described graft polymerization may be performed in solutions that contain, for example, nitric acid or ammonium cerium nitrate and the reaction conditions may be selected in various ways depending upon the type or object of use of cyclodextrin derivatives. Preferably, the ratio of PVA to cyclodextrin derivative is adjusted to lie between 1:10 amd 1:100 and in order to prevent side reactions, the reaction temperature is adjusted to 20°-100° C., preferably 20°-50° C., with the reaction time ranging from 20 min to 6 h, preferably from 20 min to 3 h. The reaction atmosphere is preferably a nitrogen atmosphere but, if desired, the reaction may be performed in ambient air. For instance, with the reaction temperature set in the range mentioned above, the reaction is carried out for 20 min to 3 h in the case of cyclodextrin derivatives of acrylic acid type (1) and (3), for 20 min to 6 h in the case of (2), and for 20 min to 1 h in the case of (4).

Further, the aforementioned object of the present invention can also be attained by a method of synthesizing cyclodextrin polymers that is characterized by reacting polyallylamine hydrochlorides with cyclodextrin derivatives, as well as by a process for producing cyclodextrin membranes using said cyclodextrin polymers.

In this case, polyallylamine hydrochlorides that permit cyclodextrin units to be introduced at high levels and which are excellent in film-forming characteristics while exhibiting various unique capabilities are used and they are reacted with cyclodextrin derivatives such as iodo-β-cyclodextrin, whereby polyallylamine-cyclodextrin polymers containing cyclodextrin units in high proportions can be obtained.

In the present invention, the reaction between the polyallylamine hydrochlorides and cyclodextrin derivatives may be performed in the following way:

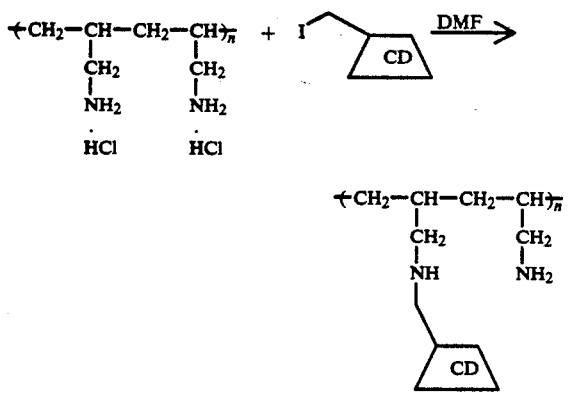

(where CD represents cyclodextrin.)

The polyallylamine hydrochlorides to be used in the reaction described above may be prepared by the following method:

Method of Synthesis of Polyallylamine Hydrochloride

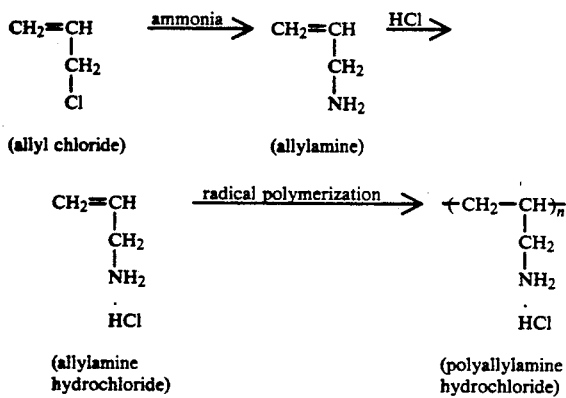

From the viewpoint of film-forming property, the polyallylamine hydrochlorides to be used are preferably selected from among those which have molecular weights of at least 10,000.

The conditions for reaction between the polyallylamine hydrochlorides and cyclodextrin derivatives may be selected as appropriate for the type or object of use of cyclodextrin derivatives; preferably, the compositional ratio for reaction between polyallylamine hydrochloride and cyclodextrin derivative ranges from 1:10 to 1:1000 in molar ratio and the reaction is performed at a reaction temperature of 40°-100° C. for a time period of 6-48 h.

A specific example of synthesis depending upon the reaction described above is outlined below.

To 50 ml of a 1M methanol solution of NaOH, 0.5 g of a polyallylamine hydrochloride having a molecular weight of 10,000 (or 60,000) was added and the mixture was stirred at 50°-60° C. for 5 h under continued dispersion. All of the polyallylamine hydrochloride dissolved and, upon neutralization, a salt was precipitated. The dispersion was concentrated to 20-30 ml under vacuum and the salt was separated by filtration; thereafter, the filtrate was concentrated under vacuum to distil off all the methanol present. Subsequently, a nitrogen atmosphere was created with the pressure maintained in vacuo and DMF was added; to the resulting solution, 6 g of separately synthesized mono-6-deoxy-6-iodo β-cyclodextrin was added and the mixture was stirred at 60°-70° C. for 24 h.

Subsequently, DMF was distilled off under vacuum and, following concentration, the residue was reprecipitated in acetone. The precipitate was thoroughly washed with water and thereafter dried to obtain a polyallylamine-cyclodextrin polymer. Measurements of the resulting polymer by elemental analysis and NMR showed that β-cyclodextrin had been introduced to a level of 24%.

Here the percent introduction of cyclodextrin is defined the total amino content minus the amount of unreacted amino groups.

The thus obtained cyclodextrin polymer was dissolved in DMF under heating and, thereafter, the solution was cast onto a glass plate which was heated in an oven at 40°-60° C. and when DMF was about to disappear, the cast polymer was dipped into water together with the glass plate, whereupon the cyclodextrin membrane separated from the glass plate. The separating membrane was washed with water and subsequently dried to provide a satisfactory β-cyclodextrin polymer film.

Examples of cyclodextrin that forms cyclodextrin derivatives for use in the present invention include α-cyclodextrin, β-cyclodextrin and γ-cyclodextrin.

The cyclodextrin polymers of the present invention may be processed into films for use as permeation or adsorptive separation membranes, or into powders or beads for use as separating column packings in gas chromatography or liquid chromatography, or into beads or pellets for use as adsorbents, trapping agents, etc.

In the present invention, the polymers obtained in the manner described above are used for making films. Film formation can be accomplished by various known methods and specific exemplary procedures are described below.

The firdst is a casting method which comprises dissolving the cyclodextrin polymer of the present invention in a solvent, casting the resulting solution onto a support and, thereafter, removing the solvent for film formation.

In one example, the polymer obtained is dissolved in dimethylformamide (DMF) or dimethyl sulfoxide (DMSO) and the resulting solution is cast onto a support such as a Teflon plate, glass plate or metal plate and, thereafter, the solvent is removed (e.g. evaporated) to form a film. Both the DMF and DMSO that are used in this method have high boiling points and will not readily evaporate, so heat may be applied at 40°-60° C. and at the time when the solvents have evaporated to some extent, the support is dipped into water and the film is separated, washed with water and dried to obtain a cyclodextrin membrane.

Another method that can be adopted is an extrusion process in which the cyclodextrin polymer of the present invention is heated to melt, extruded and drawn to be shaped into a film.

BEST MODE FOR CARRYING OUT THE INVENTION

The following examples are provided for the purpose of further illustrating the present invention.

EXAMPLE 1

Ten grams of PVA (mol. wt. 10,000), 10 ml of methanol and 0.05 g of sulfuric acid were added to 100 ml of water and the mixture was stirred under heating at 40°-50° C. To the stirred mixture, 9 g of ClCH$_2$CH$_2$CHO (3-chloropropionaldehyde) was added; to 30 g of the resulting solution, an additional 9 g of ClCH$_2$CH$_2$CHO was added with stirring and the remaining PVA solution was added in 30-60 min. Thereafter, in order to suppress the crosslinking of PVA and to prevent the loss of solubility, ca. 60 ml of hot water (70°-80° C.) was added over 30 min and the mixture was stirred for an additional 30 min. Subsequently, 0.5 g of conc. sulfuric acid as dissolved in 3 ml of water was added, followed by 1-h stirring to insure that any uncreated components would undergo complete reaction. After leaving it to cool to room temperature, the reaction mixture was filtered and the filtrate was washed with water, further washed with a dilute caustic soda solution and vacuum dried to obtain a polymer.

Subsequently, 6 g of β-cyclodextrin was dissolved in DMF and, after adding 0.2 g of NaH to the solution, the mixture was stirred at 50°-60° C. for 30 min and left to cool, followed by filtration. The filtrate was added dropwise to a DMF solution having dissolved therein 5 g of the previously obtained polymer. Thereafter, reaction was performed at 70°-80° C. for 24 h and DMF was distilled off until a highly viscous liquid was obtained, whereupon it was added to acetone for reprecipitation.

The resulting polymer was washed thoroughly with water and dried to obtain a cyclodextrin polymer.

Measurement of the percent introduction of cyclodextrin by elemental analysis and NMR verified that the level of β-cyclodextrin introduction was ca. 15%.

Here, the percent introduction of cyclodextrin is defined as the amount of Cl groups obtained from the reacted OH groups in PVA minus the amount of unreacted Cl residues.

Subsequently, the thus obtained cyclodextrin polymer was dissolved in DMF by heating and, thereafter, the solution was cast onto a glass plate which was heated in an oven at 40°-60° C. and when DMF was about to disappear, the cast polymer was dipped into water together with the glass plate, whereupon the film separated. The separated film was thoroughly washed with water and dried to obtain a satisfactory β-cyclodextrin polymer membrane.

EXAMPLE 2

As in Example 1, PVA was reacted with 3-hydroxypropionaldehyde (HOCH$_2$CH$_2$CHO) to obtain a polymer represented by:

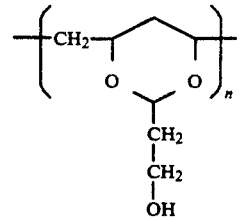

Five grams of this polymer was dissolved in DMF and 2.0 g of NaH was added to the solution. Subsequently, the mixture was stirred at 50°-60° C. for 2 h, left to cool and filtered. The filtrate was added dropwise to a DMF solution having dissolved therein 6.2 g of separately synthesized mono-6-deoxy-6-iodo β-CD

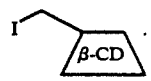

Reaction was performed as in Example 1, so were reprecipitation and drying to obtain a cyclodextrin polymer. The level of β-cyclodextrin introduction into this polymer was ca. 10%.

The thus obtained polymer was subjected to a film-forming process as in Example 1, whereupon a satisfactory β-cyclodextrin polymer membrane was obtained.

EXAMPLE 3

As in Example 1, PVA was reacted with 3-aminopropionaldehyde (H$_2$NCH$_2$CH$_2$CHO) to obtain a polymer represented by:

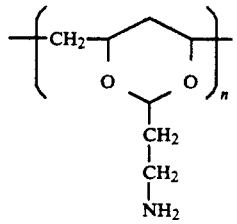

Cyclodextrin was introduced by using

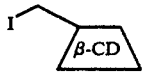

as in Example 2, except that NaH was not used and reaction was effected by merely stirring the mixture. The resulting polymer had cyclodextrin introduced by a degree of ca. 18%.

The thus obtained polymer was subjected to a film-forming process as in Example 1, whereupon a satisfactory β-cyclodextrin polymer membrane was obtained.

EXAMPLE 4

To 100 ml of water, 10 g of PVA, 10 ml of DMF and 0.05 g of sulfuric acid were added and the mixture was stirred with heating at 40°-50° C. To the stirred mixture, 5 g of propionaldehyde β-cyclodextrin in DMF was added. To 30 g of the solution, an additional 5 g of propionaldehyde β-cyclodextrin in DMF was added with stirring and, subsequently, the remaining PVA solution was added in 30–60 min.

Thereafter, ca. 60 ml of hot water (70°–80° C.) was added over 30 min and the mixture was stirred for another 30 min. Subsequently, 0.5 g of conc. sulfuric acid as dissolved in 3 ml of water was added, followed by stirring for 1 h. After leaving it to cool to room temperature, the mixture was filtered and the filtrate was washed first with water, then with a dilute caustic soda solution and dried to obtain a polymer. The resulting cyclodextrin polymer had cyclodextrin introduced by 18–20%.

The thus obtained cyclodextrin polymer was subjected to a film-forming process as in Example 1, whereupon a satisfactory $\beta$-cyclodextrin polymer membrane was obtained.

EXAMPLE 5

Ten grams of PVA was dissolved in 100 ml of DMF and, after adding 1.5 g of N,N'-carbonyl diimidazole, reaction was performed at 60°–70° C. Six to seven hours later, DMF was distilled off under vacuum and the residue was added to acetone, followed by reprecipitation to form a polyvinyl alcohol derivative. The level of introduction of carbonyl groups into PVA was ca. 70%.

Subsequently, 6.0 g of the thus obtained polymer was dissolved in DMF and, to the resulting solution, 5.8 g of 2-aminoethylamino $\beta$-cyclodextrin was added and reaction was performed at 60°–70° C. for 24 h. Thereafter, DMF was distilled off under vacuum and the residue was added to acetone, followed by reprecipitation to obtain a precipitate. The resulting polymer precipitate was separated by filtration, washed thoroughly with water and dried. The thus obtained cyclodextrin polymer had cyclodextrin introduced to a level of ca. 28%.

The thus obtained cyclodextrin polymer was subjected to a film-forming process as in Example 1, whereupon a satisfactory $\beta$-cyclodextrin polymer membrane was obtained.

EXAMPLE 6

The epoxy portion of allylglycidyl ether was subjected to ring opening with hydrochloric acid and the resulting allyl-3-chloro-2-hydroxypropyl ether was reacted with a sodium salt of $\beta$-cyclodextrin in DMF at ca. 70° C. for 24 h to obtain $\beta$-cyclodextrin derivative (1) mentioned hereinabove.

With the molar ratio of vinyl acetate to the resulting $\beta$-cyclodextrin derivative being adjusted to 7:3, a polymerization initiator AIBN was added in 50 ml of DMF in an amount of 0.1–1.0 wt. % of monomer and polymerization was performed at 60° C. for 24 h. The resulting monomer concentration was 30–50 wt. %.

After the reaction, reprecipitation was conducted with methanol and the precipitate was washed and vacuum dried to obtain a cyclodextrin polymer. One gram of the resulting polymer and 50 ml of a saponifying solution (5 parts of methyl alcohol and 1 part of 2.5N aqueous solution of sodium hydroxide) were reacted under reflux for ca. 10 h and, after washing with water, the reaction product was dried to obtain a cyclodextrin polymer. The polymers obtained had molecular weights of ca. 50,000–60,000. The percent introduction and the saponification degree could be determined by elemental analysis and NMR.

EXAMPLE 7

Allylhydroxyethyl ether and a monotosylate or monoiodide of $\beta$-cyclodextrin were reacted in DMF in the presence of NaH at ca. 70° C. for 24 h, whereby $\beta$-cyclodextrin derivative (2) mentioned hereinabove was obtained. The thus obtained $\beta$-cyclodextrin derivative was copolymerized with vinyl acetate as in Example 6, so was the copolymer saponified to obtain a cyclodextrin polymer.

EXAMPLE 8

The epoxy portion of glycidyl methacrylate was subjected to ring opening with hydrochloric acid and the resulting 3-chloro-2-hydroxypropyl methacrylate was reacted with a Na salt of $\beta$-cyclodextrin in DMF at ca. 60° C. for 24 h to obtain $\beta$-cyclodextrin derivative (3) mentioned hereinabove. With the molar ratio of methyl acrylate to the resulting $\beta$-cyclodextrin derivative being adjusted to 7:3, a polymerization initiator AIBN was added in 50 ml of DMF and polymerization was performed at 40° C. for 12 h. After the reaction, reprecipitation was conducted with methanol and the precipitate was washed repeatedly and vacuum dried to obtain a cyclodextrin polymer.

EXAMPLE 9

Hydroxyethyl methacrylate and a monoiodide of $\beta$-cyclodextrin were reacted in DMF in the presence of $Ag_2O$ (or BaO) at ca. 60° C. for 12 h to obtain $\beta$-cyclodextrin derivative (4) mentioned hereinabove. The thus obtained $\beta$-cyclodextrin derivative was copolymerized with methyl acrylate as in Example 8 to obtain a cyclodextrin polymer.

Each of the copolymers, either saponified or unsaponified, that were obtained in Examples 6–9 was dissolved in DMF by heating and, thereafter, the solution was cast onto a glass plate which was heated in an oven at 40°–60° C. and when DMF was about to disappear, the cast polymer was dipped into water together with the glass plate, whereupon the film separated. The separated film was washed with water and dried to obtain a satisfactory cyclodextrin membrane.

EXAMPLE 10

In accordance with reaction scheme (F) described hereinabove, cellulose (mol. wt. ca. 50,000) was suspended in pyridine and paratoluenesulfonyl chloride dissolved in chloroform was added to the suspension. The system was stirred first at 0° C. for 6 h, then at room temperature for 24 h; thereafter, the unreacted cellulose was filtered and the filtrate was distilled off under vacuum at 40° C. or below, with the residue being reprecipitated with a large volume of acetone. The resulting white precipitate was recrystallized from ethanol to obtain cellulose tosylate.

The obtained cellulose tosylate was reacted in DMF with separately synthesized 2-aminoethylamino-$\beta$-cyclodextrin at 70° C. for 24 h and, after the end of the reaction, DMF was concentrated under vacuum and the residue was subjected to repeated reprecipitation from a large volume of acetone, yielding a product in which cellulose was chemically bound to $\beta$-cyclodextrin.

EXAMPLE 11

In accordance with reaction scheme (G)-①described hereinabove, cellulose (mol. wt. ca. 50,000) was suspended in pyridine and p-toluenesulfonic acid acid chloride dissolved in chloroform was added to the suspension. The system was stirred first at 0° C. for 6 h, then at room temperature for 24 h; thereafter, the unreacted cellulose was filtered and the filtrate was distilled off under vacuum at 40° C. or below, with the residue being reprecipitated from a large volume of acetone.

The resulting white precipitate was recrystallized from ethanol to obtain cellulose tosylate.

Subsequently, β-cyclodextrin was dissolved in DMF and reacted with NaH at room temperature in a nitrogen stream. After the passage of 30–60 min, the reaction mixture was filtered and a DMF solution of the previously synthesized cellulose tosylate was slowly added dropwise to the filtrate; after the dropwise addition, the mixture was stirred at 70°–80° C. for 24 h. After the end of the reaction, DMF was distilled off under vacuum and the residue was reprecipitated from a large volume of acetone. The resulting precipitate was repeatedly washed with hot ethanol and the residual precipitate was vacuum dried to obtain the end compound.

EXAMPLE 12

In accordance with reaction scheme (H)-①described hereinabove, carboxycellulose (mol. wt. ca. 50,000) was chlorinated with thionyl chloride with benzene and pyridine being used as a solvent and a base, respectively. The reaction was performed under reflux for 8 h and, after the end of the reaction, the reaction mixture was left to cool and filtered, with the solvent being distilled off under vacuum and the residue being reprecipitated from a large volume of dehydrated acetone. The resulting acid chloride of cellulose was vacuum dried. The subsequent procedure was in accordance with either the following 1-ⓐ or 1-ⓑ.

1-ⓐ

In the next step, separately synthesized mono-6-deoxy-6-amino-β-CD was dissolved in DMF and, to the solution, a DMF solution having the acid chloride of cellulose dissolved therein at room temperature in a nitrogen stream was added dropwise and, after the end of the dropwise addition, the mixture was subjected to reaction at 70°–80° C. for 12 h. After the end of the reaction, the reaction mixture was left to cool to room temperature and DMF was distilled off under vacuum, with the residue being reprecipitated with a large volume of acetone. The precipitate separated by filtration was washed thoroughly with ethanol and the residual precipitate was vacuum dried to obtain a cellulose-type cyclodextrin derivative.

1-ⓑ

In the next step, β-cyclodextrin was dissolved in DMF and pyridine was added as a base to the solution at room temperature in a nitrogen stream. Thirty minutes later, a DMF solution having the acid chloride of cellulose dissolved therein was added dropwise, and after the end of the dropwise addition, reaction was performed at 70°–80° C. for 12 h. After the end of the reaction, the reaction mixture was left to cool to room temperature and the precipitate was filtered. DMF was distilled off under vacuum and the residue was reprecipitated with a large volume of acetone. The precipitate separated by filtration was washed thoroughly with ethanol and water and the residual precipitate was vacuum dried to obtain a cellulose-type cyclodextrin derivative.

EXAMPLE 13

In accordance with reaction scheme (I), ammonium cerium nitrate (($NH_4$)$_2$Ce($NO_3$)$_6$) was dissolved in 1N nitric acid ($HNO_3$) to a concentration of 0.1 mol/L of solution. In a separate step, 1 g of PVA (mol. wt.: ca. 10,000) and 5 g of acrylic acid amide/cyclodextrin were dissolved in 100 ml of water and 2.5 ml of the nitric acid solution was added to the resulting solution, followed by a polymerization reaction in a nitrogen atmosphere at 20° C. for 1 h. The reaction solution was poured into ca. 2,000 ml of acetone to perform reprecipitation, followed by filtration and repeated washing with water; thereafter, vacuum drying was effected to obtain a precipitate of a PVA-acrylic acid amide CD graft copolymer.

The reaction for graft-polymerizing a cyclodextrin derivative of a methacrylic acid type was carried out in accordance with reaction scheme (I) or (J) described hereinabove under the same conditions except that potassium peroxodisulfate ($K_2S_2O_8$) was used as a reaction catalyst. As for the reaction time, a period of 1–48 h, preferably 6–24 h, was employed.

EXAMPLE 14

Two grams of PVA (mol. wt. ca. 10,000) was dissolved in 50 ml of DMSO and, to the solution, 5 mg of potassium peroxodisulfate ($K_2S_2O_8$) and 6 g of β-cyclodextrin of methacrylic acid type (5) were added. The mixture was cooled and the tubes on the reactor were fused. Reaction was then carried out at 40° C. for 24 h.

After the end of the reaction, the reaction solution was poured into 2,000 ml of acetone for reprecipitation; thereafter, the precipitate was separated by filtration, washed thoroughly with water and vacuum dried to obtain a graft copolymer (degree of polymerization: ca. 40%).

The copolymers obtained in Examples 13 and 14 were subjected to elemental analysis and NMR and they were found to have cyclodextrin introduced to levels of ca. 40%.

It should be noted again that in the present invention, the percent introduction of cyclodextrin is defined in terms of the percent conversion of hydroxyl groups (—OH) in PVA.

The cyclodextrin polymers obtained in Examples 10–14 were subjected to a film-forming process as in Example 1, whereupon satisfactory β-cyclodextrin polymer membranes were obtained.

As described in detail on the foregoing pages, the cyclodextrin polymers obtained by the present invention are capable of containing cyclodextrin as introduced at high levels and, in addition, cyclodextrin membranes obtained by using the cyclodextrin polymers of the present invention benefit form the fact that the polymers themselves have a film-forming property and, hence, the membranes can be used on their own without needing other supporting membranes. Further, polyvinyl alcohol has such high film strength that the cyclodextrin membranes can withstand continuous handling. If desired, the unreacted hydroxyl groups in the cellulose to be used may be crosslinked to render the membranes more insoluble to impart higher strength.

INDUSTRIAL APPLICABILITY

The cyclodextrin polymers of the present invention may be processed into films for use as permeation or adsorptive separation membranes, or into powders or beads for use as separating column packings in gas chromatography or liquid chromatography, or into beads or pellets for use as adsorbents, trapping agents, etc. adsorbents, trapping agents, etc.

I claim:

1. A method of synthesizing a cyclodextrin-containing linear polymer by reacting a cyclodextrin derivative with polyvinyl alcohol or a derivative thereof, vinyl acetate, methyl methacrylate or a cellulose derivative.

2. A method of synthesizing a cyclodextrin-containing linear polymer according to claim 1 wherein the derivative of polyvinyl alcohol is the reaction product of polyvinyl alcohol with a carbonyl compound.

3. A method of synthesizing a cyclodextrin-containing linear polymer according to claim 2 wherein the carbonyl compound is an aldehyde and the reaction product is an acetal.

4. A method of synthesizing a cyclodextrin-containing linear polymer according to claim 2 wherein the carbonyl compound is a ketone.

5. A method of synthesizing a cyclodextrin-containing linear polymer according to claim 1 wherein the cyclodextrin derivative is the reaction product of cyclodextrin with an aldehyde.

6. A method of synthesizing a cyclodextrin-containing linear polymer according to claim 1 wherein the cyclodextrin derivative is grafted onto the polyvinyl alcohol or derivative thereof.

7. A method of synthesizing a cyclodextrin-containing linear polymer according to claim 1 wherein the cyclodextrin derivative is copolymerized with the vinyl acetate.

8. A method of synthesizing a cyclodextrin-containing linear polymer according to claim 1 wherein the cyclodextrin derivative is copolymerized with the methyl methacrylate.

9. A method of synthesizing a cyclodextrin-containing linear polymer according to claim 1 wherein the cellulose derivative is a cellulose tosylate, a cellulose halide, an acid chloride of carboxycellulose or an acid chloride of carboxymethyl cellulose.

* * * * *